INVENTOR.
CHARLES A. CAMPBELL
BY
[signature]
ATTORNEY

Nov. 20, 1962

C. A. CAMPBELL

DECIMAL TO BINARY AND BINARY-DECIMAL TO BINARY CONVERTER 3,064,894

Filed Oct. 9, 1956

2 Sheets-Sheet 2

INVENTOR.
CHARLES A. CAMPBELL
BY
Hyman Hurwitz
ATTORNEY

United States Patent Office 3,064,894
Patented Nov. 20, 1962

3,064,894

DECIMAL TO BINARY AND BINARY-DECIMAL TO BINARY CONVERTER

Charles A. Campbell, % Radiation Inc., Melbourne, Fla.
Filed Oct. 9, 1956, Ser. No. 614,917
5 Claims. (Cl. 235—155)

Figure 1:
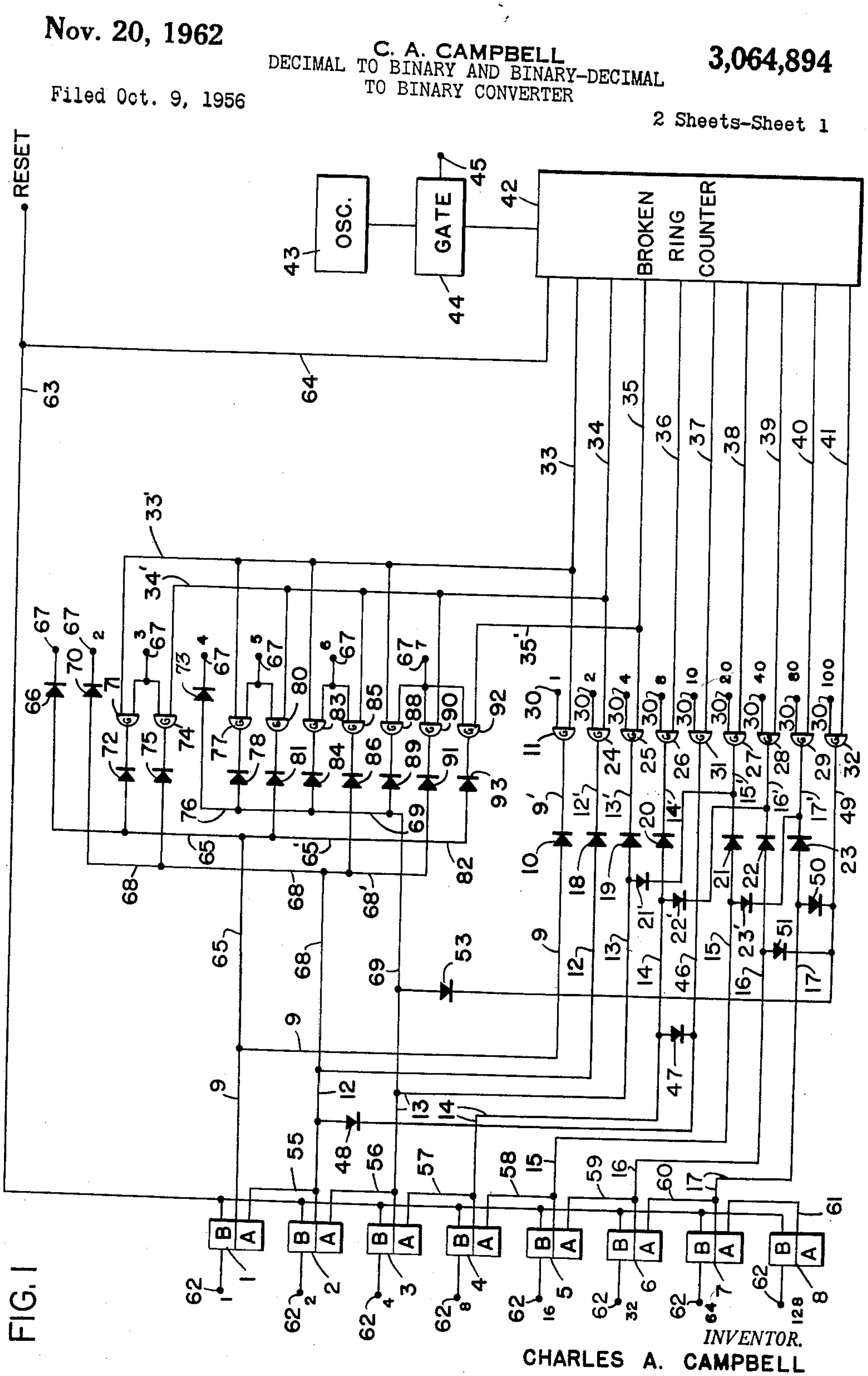

The present invention relates generally to systems for at will converting voltage pulses representative of a number of either the binary decimal system of notation or the decimal system of notation to voltage representations of numbers in the binary system of notation and more particularly to a system for rapidly converting voltage pulses representative of either decimal numbers or binary-decimal numbers to representations in the binary number system, and still more particularly to such systems capable of effecting summation of numbers which are applied randomly in either system of notation.

It is an object of the present invention to provide a binary-decimal and/or decimal-to-binary converter utilizing a minimum number of basic circuit elements, which may be multiplied to extend the range of numbers subject to conversion.

It is another object of the present invention to provide a number conversion system which may accept single voltage pulses indicative of a number in the decimal system, and groups of voltage pulses representative of binary-decimal numbers.

It is another object of the present invention to provide a binary-decimal-to-binary converter and a decimal-to-binary converter employing the same conversion elements.

It is another object of the present invention to provide a decimal-to-binary and binary-decimal-to-binary converter for converting voltage pulses arranged in accordance with either the decimal or binary-decimal number systems to voltages arranged in accordance with the binary system of notation and to convert the individual numbers of either system to the binary system, the summation of individual numbers of either system to the binary system and the summation of numbers in both the decimal and the binary-decimal system to the binary system.

In the true binary system of number notation the entire number is written in binary form, whereas in the binary-decimal system of number of notation each digit of a number is converted to a separate binary number represented by four binary bits. For example, the number 128 is written in the binary form as 1,000,000. When the same number is written in the binary-decimal system, the one appears as a distinct four unit binary number having the form 0001. The two and the eight are also written as distinct four-fifth numbers and are respectively 0010 and 1000. Consequently, the number 128 is written in the binary-decimal form as 0001, 0010, 1000.

In accordance with the present invention, conversion of a group of voltage pulses representative of a binary-decimal number to a group of voltage pulses representative of a number in the binary form is accomplished by utilizing a conventional binary counter chain; that is, a chain of cascaded flip-flops. A flip-flop is a bi-stable circuit element capable of assuming alternately two conditions or states of conduction hereinafter referred to as the A and B states of conduction with the A state taken as the initial state for purposes of illustration. The change from one state to the other state is effected in response to voltage pulses applied to the flip-flop and upon the application of each group of two voltage pulses, each flip-flop in the chain produces an output voltage pulse which is applied to the input circuit of the next succeeding flip-flop in the binary chain to effect switching of the next flip-flop from one to the other state of conduction. The flip-flops are arranged in the binary chain so that the first flip-flop in the chain, when in the B state of conduction, indicates a binary 1 and each succeeding flip-flop when in its B state of conduction indicates the next succeeding highest order binary number. The binary-decimal numbers 1, 2, 4 and 8 which correspond directly with their binary number equivalents 1, 2, 4 and 8 are applied directly to the input circuits of the flip-flops arranged in the binary 1, 2, 4 and 8 positions in the flip-flop chain. The voltage pulses indicative of higher order binary-decimal numbers such as 10, 20, 40 and 80 are coupled to the input circuits of two or more flip-flops whose positions in the chain are such as to produce a total output in the binary system equivalent to the binary-decimal number applied thereto. Thus, an input voltage indicative of the binary-decimal number 20 is applied to the flip-flops producing ouput voltages indicative of the binary numbers 16 and 4 whose sum is equal to 20. Upon the application of a voltage indicative of a particular number in the binary-decimal system, the flip-flops in the binary chain are set to the states of conductions for producing a group of output voltages indicative of the binary equivalent of the binary-decimal number applied. This number is stored in the flip-flops so that upon the application of succeeding voltage pulses indicative of binary decimal numbers the numbers applied are added to the numbers previously stored to provide a group of output voltages equal to the sum of the binary-decimal numbers applied. In order to prevent interaction between input voltage pulses indicative of a binary-decimal number and voltage pulses generated as a result of flip-flop switching, the voltages indicative of the various binary-decimal numbers are fed to the input of the conversion circuit sequentially and successively; that is, the voltage pulse indicative of the lowest order binary-decimal number; that is, binary-decimal number 1, is applied first and thereafter the voltage pulse indicative of the binary-decimal number 2 is applied and so forth until all the pulses indicative of the various binary-decimal numbers have been supplied to the converter. The voltage pulses may also be applied in descending order with the pulse indicative of the binary-decimal 1 being applied last.

As previously indicated, the conversion system is also capable of converting a voltage indicative of a number in the decimal system of notation to voltage groups indicative of numbers in the binary system of notation. In one specific embodiment of the invention the individual voltage pulses indicative of decimal numbers corresponding to binary numbers, such as the numbers 1, 2, 4, 8, 16, etc., are applied directly to the flip-flops in the conversion circuit which produce output voltages indicative of these numbers. The voltages indicative of the decimal numbers which are represented in the binary system by the voltage indications generated by more than one flip-flop are gated to the flip-flops in time sequence so as to prevent interaction between input pulses and pulses generated by the flip-flops as a result of switching. For instance, the voltage pulse indicative of the decimal number 3 must be applied to the flip-flops in the binary 1 and 2 positions and in order to prevent interaction between the voltage applied to the flip-flop in the binary 2 position with a transfer feedforward pulse from the binary 1 flip-flop produced in the event that this latter flip-flop was storing a "one," the application of one of these pulses to the binary 2 flip-flop must be delayed for a sufficient length of time to allow the flip-flop to respond fully to the other pulse.

In order to properly sequence the application of the voltage pulses indicative numbers in the binary-decimal system to the binary chain, each voltage pulse is applied to one input circuit of a different dual input coincident gate, the output circuit of each gate being connected via a lead or leads to the input circuit of the flip-flop or flip-flops to which the voltage pulse is to be applied. The other input circuit of each gate is energized by a distinct stage of a broken ring counter which is cycled by a conventional oscillator. Voltage pulses appear at the second input circuit of each of the gates sequentially and successively so that a group of pulses representative of a binary-decimal number are gated through their respective gates at distinct intervals and in consequence interaction between various input voltage pulses is prevented. The decimal voltages which must be applied to more than one flip-flop in the binary chain are coupled through a distinct gate to each of the flip-flops required to be energized, the gates associated with a given decimal number having their second input circuit coupled to receive gating voltage pulses from different stages of the broken ring counter. Voltage pulses representative of numbers in the decimal and binary-decimal systems are not applied to the converter at the same time and consequently only a single broken ring counter is required to control the gates for timing the voltage pulses indicative of numbers in the decimal and binary-decimal systems.

In a second and preferred embodiment of the present invention, gating of the voltage pulses representative of decimal numbers is not required. In this embodiment of the invention, delay lines are inserted between the various flip-flops in the binary chain so that transfer or feed-forward pulses generated when the flip-flops change from one state to the other state of conduction are delayed for a sufficient length of time to prevent interaction with directly applied input pulses. In this modification of the invention it is still necessary to gate the voltage pulse indicative of binary-decimal numbers although by the insertion of suitable delay lines in the inputs to the flip-flops, gating of these voltage pulses may also be eliminated completely.

The flip-flops have been referred to as having two states of conduction; thereby implying that the flip-flops comprise tube circuits. It is not intended to limit the present invention to the utilization of bi-stable elements employing tube circuits and it is within the scope of the present invention to employ other bi-stable circuit elements such as saturable reactors in which event the input information may be in the form of current rather than voltage pulses.

It is, therefore, another object and feature of the present invention to provide a binary-decimal-to-binary and decimal-to-binary converter which may be built up from a minimum number of conventional bi-stable flip-flops and conventional gating elements.

It is another object of the present invention to provide a binary-decimal-to-binary and decimal-to-binary converter utilizing a conventional binary counter to effect conversion and the simultaneous summation of sequentially applied voltage pulses to provide the binary form of the total of the numbers represented by successive input voltage pulses whether the voltages be applied in accordance with the decimal system of notation or the binary-decimal system of notation or both.

Figure 2:
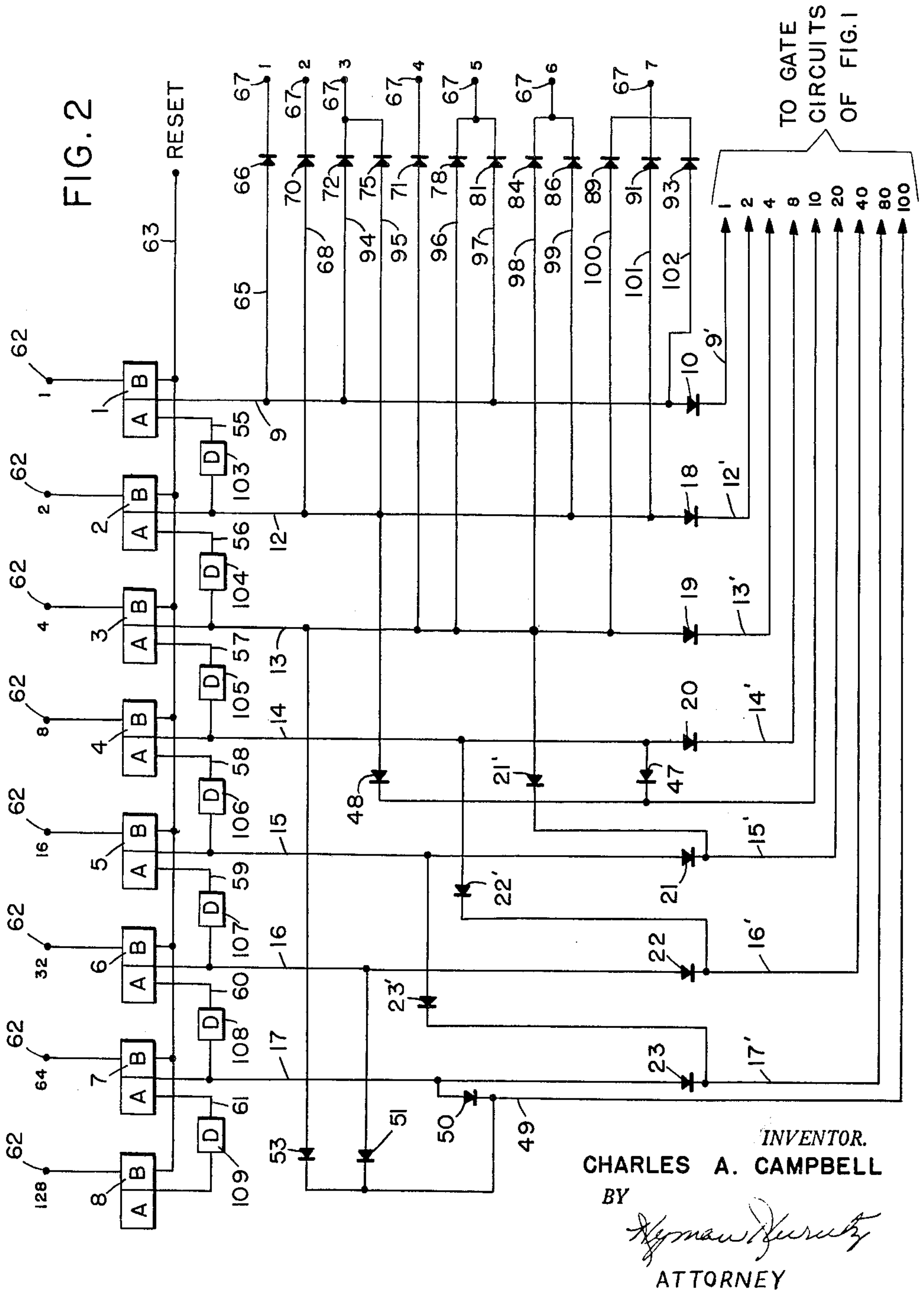

The above and still further objects, features and advantages of the present invention will become apparent upon consideration of the following detailed description of one specific embodiment thereof, especially when taken in conjunction with the accompanying drawings, wherein:

FIGURE 1 is a schematic block diagram of a first specific embodiment of the present invention; and FIGURE 2 is a schematic block diagram of a preferred embodiment of the present invention.

Referring specifically to FIGURE 1 of the accompanying drawings there is provided a plurality of flip-flops or bi-stable circuit elements 1 through 8 which may be of conventional design but are preferably of the type illustrated and described in my copending patent application, Serial No. 581,142, filed April 27, 1956, now Patent No. 2,933,364, issued April 19,1960, for Binary-to-Binary Decimal Converter. The flip-flops are illustrated conventionally as blocks divided into two sections designated as A and B sections. The flip-flops 1 to 8 are bi-stable circuit elements normally comprising two vacuum tubes having their plates and control grids interconnected and further having their control grids connected in parallel to an input circuit so that upon receipt of successive pulses the tubes in the A and B sections of the flip-flops are rendered conductive alternately. The flip-flops 1 to 8 are adapted to change their state of conduction upon the receipt of a negative pulse, only, as described in the aforementioned patent application. Consequently, the flip-flops 2 through 8 are effected by voltages generated by the next preceding flip-flop in the chain only when the preceding flip-flop changes from the B to the A state of conduction; that is, when the tube in the A stage of the flip-flop changes from its non-conductive to its conductive state and its plate voltage falls. The normal or starting condition of the flip-flops 1 through 8 is when the tube in the A section is conducting and thus a reset pulse applied as explained subsequently to the B states of these flip-flops must be negative so as to render the B state non-conductive and the A state conductive. The input circuit of the flip-flop 1 is connected via a lead 9 and an isolation diode 10 connected in series to a timing gate 11. The flip-flops 2 through 7 are connected via leads 12 through 17, isolation diodes 18 through 23 and leads 12' through 17' in series to timing gates 24, 25, 26, 27, 28 and 29, respectively. The timing gates 11 and 24 through 29 are conventional diode coincidence gates having two input circuits and a single output circuit and requiring that pulses of the same polarity be applied simultaneously to both input circuits to produce a voltage pulse in the output circuit. A first input circuit of each of the gates 11 and 24 through 29 is connected to a different input terminal 30 the numerals 1, 2, 4, 8, 20, 40 and 80 appearing at the right of the terminals in FIGURE 1 designating the binary-decimal number represented by the pulse applied to that particular terminal. In addition to the timing gates 11, 24 through 29 there is provided two additional gates 31 and 32, the gate 31 having a first input circuit connected to an input terminal 30 adapted to receive pulses indicative of the binary-decimal number 10 and the gate 32 having a first input circuit connected to a terminal 30 adapted to receive pulses representing the binary-decimal number 100. The second input circuit of the gates 11, 24, 25, 26, 31, 27, 28, 29 and 32 are connected respectively via leads 33, 34, 35, 36, 37, 38, 39, 40 and 41 to the successive output stages of the broken ring counter 42 conventionally illustrated as the block 42. The broken ring counter 42 is a well-known circuit element comprising a plurality of cascaded tubes, nine in the present instance, wherein successive input pulses to the counter render successive tubes conductive to produce a pulse in their output circuits. An oscillator 43 employed to generate stepping voltage pulses for the broken ring counter 42 are applied to the counter via a coincidence gate 44 which is adapted to receive gating pulses via an input lead 45.

The gate 31 is adapted to generate output voltage pulses on a lead 46 which is connected through a diode 47 to the lead 14 connected to the input circuit of the flop-flop 4 and via a diode 48 to the lead 12 connected to the input circuit of a flip-flop 2. The gate 32 is adapted to generate voltage pulses on a lead 49 and via a diode 50 to the lead 17 connected to the input circuit of the flip-flop 7 via a diode 51 and a lead 52 to lead 16 connected to the input circuit of the flip-flop 6 and via a diode 53 and a lead 54 to the lead 13 connected to the input circuit of the flip-flop 3. The lead 17′ is further connected through a diode 23′ to the lead 15 while the leads 15′ and 16′ are connected via diodes 21′ and 22′ to the leads 13 and 14, respectively. The lead 12 is further connected via a lead 55 to the output circuit of the flop-flop 1 while the leads 13, 14, 15, 16 and 17 are connected via leads 56—60 to receive pulses generated in the output circuit of the A sections of the flip-flops 2, 3, 4, 5 and 6, respectively. The input circuit of the flip-flop 8 is connected via a lead 61 to receive output voltage pulses generated in the A section of the flip-flop 7. The B sections of the flip-flops 1 through 8 are connected each to a different output terminal 62, the numerals 1, 2, 4, 8, 16, 32, 64, and 128 appearing to the left of the respective terminals 62, in FIGURE 1, designating the binary number represented by the voltage appearing at that particular terminal. The B sections of each of the flip-flops 1 through 8 are connected to receive reset pulses via a lead 63, the reset pulses applied to the lead 63 also being applied over leads 64 to the broken ring counter 42 so that all of the flip-flops 1 through 8 and the broken ring counter 42 are reset to an initial condition simultaneously.

The lead 9 is further connected via a lead 65 and a diode 66 to input terminal 67 while the leads 12 and 13 are connected via leads 68 and 69 and diodes 70 and 73, respectively, to further input terminal 67. The numerals 1, 2, 3, 4, 5, 6, 7 appearing to the right of the input terminals 67 in FIGURE 1 are indicative of the decimal number represented by a pulse applied to the particular terminal. The terminal 67 designated by the decimal number 3 is connected via a gate 71 and a diode 72 to the lead 65, and via a gate 74 and a diode 75 to the lead 68. The terminal 67 designated by the decimal number 5 is connected via a lead 77 and a diode 78 to the lead 69 and via a gate 80, diode 81 and lead 65′ to the lead 65. The terminal 67 designated by the numeral 6 is connected via a gate 83 and a diode 84 to the lead 69 and through a gate 85, a diode 86 and a lead 68′ to the lead 68. The terminal 67 designated by the decimal number 7 is connected through a gate 88 and a diode 89 to the lead 69, through a gate 90 and a diode 91 to the lead 68′ and through a gate 92 and a diode 93 to the lead 65′. The second input circuit of each of the gates 71, 77, 83 and 88 are connected via a lead 33′ to the lead 33 which in turn is connected to the output circuit of the first stage of the broken ring counter 42. The second input circuit of the gates 74, 80, 85 and 90 are connected via a lead 34′ to the lead 34 which is adapted to receive output voltage pulses from the second stage of the broken ring counter 42 and the gate 92 has its second input circuit connected via a lead 35′ to the lead 35 connected to receive output voltage pulses from the third stage of the broken ring counter 42.

The apparatus of the present invention is adapted to convert either decimal or binary-decimal numbers to numbers in the binary system of notation. Proceeding now to a description of the operation of the embodiment of the invention illustrated in FIGURE 1 of the accompanying drawings, the operation of the system in converting a number in the binary-decimal system of representation to a number in the binary system of representation is first described. Assuming initially that it is desired to apply successive voltage pulses indicative of the binary-decimal numeral 1 to the circuit and to convert the summation of these numbers to the binary system, successive voltage pulses are applied to the terminal 30 designated by the numeral 1. Upon the application of each pulse to the binary-decimal 1 terminal 30 a gating pulse is also applied to the lead 45 of the gate 44. In consequence, voltage pulses generated by the oscillator 43 are fed to the input of the broken ring counter 42 which generates neagtive voltage pulses sequentially and successively on the leads 33 through 41. The first voltage pulse generated by the broken ring counter 42 appears on the lead 33 and gates the information appearing on the binary-decimal 1 terminal 30 via the lead 9′, diode 10 and lead 9 to the flip-flop 1. Upon the application of a negative voltage pulse to the flip-flop 1 it changes its state of conduction from the A to the B state and applies a negative voltage to the output terminal 62 designated by the binary number 1. In changing from the A to the B state of conduction the flip-flop 1 generates a positive pulse on the lead 55 which has no effect upon the flip-flop 2. Upon the application of a second voltage pulse to the terminal 30 designated by the binary-decimal numeral 1 the flip-uop 1 changes from the B to the A state of conduction removing the negative voltage from the terminal 62 designated by the numeral 1 and produces a negative pulse on the lead 55. The negative pulse appearing on the lead 55 causes the flip-flop 2 to change from the A to the B state of conduction. Upon the flip-flop 2 achieving the B state of conduction a negative voltage is applied to the terminal 62 designated by the binary numeral 2 and a positive pulse is applied to the input circuit of the flip-flop 3, the positive pulse having no effect on the circuit. Upon the application of a third pulse to the terminal 30 designated by the binary-decimal numeral 1, the flip-flop 1 is changed from the A to the B state of conduction and now negative voltages appear at the terminals 62 designated by the numerals 1 and 2. When the fourth pulse is applied to the binary-decimal 1, terminal 30, the flip-flop 1 switches from the B to the A state of conduction and produces a negative pulse on the output lead 55, this negative voltage pulse causing the flip-flop 2 to change from the B to A state of conduction to thereby produce a negative voltage pulse on the output lead 56 which switches the flip-flop 3 from the A to the B state of conduction. A negative voltage now appears at the output terminal 62 designated by the numeral 4 and therefore the binary number represented by the circuit is 4. As an example of the operation of the circuit, upon the application of a binary-decimal number which does not correspond directly with the binary representation let it be assumed that a pulse is applied to the terminal 30 designated by the binary-decimal number 10. Upon the appearance of a voltage pulse on the lead 37 adapted to be energized by the broken ring counter 42 a pulse is gated through the gate 31 and is applied via the elad 46, and diodes 47 and 48 to the leads 14 and 12, respectively, of the flip-flops 4 and 2. The flip-flops 4 and 2 in consequence are both switches to the B state of conduction and a negative voltage appears at the output terminals 62 designated by the binary numbers 8 and 2, the sum of which is 10.

Sequencing of the input voltages to the various terminals 30 is required to prevent interaction between pulses applied to the terminals 30 and the feedforward or transfer pulses generated by the various flip-flops on the leads 55 through 61. As an example, let it be assumed that circuit initially indicates an output equal to the binary number 1; that is, the flip-flop 1 is in the B state of conduction and a negative voltage appears at the output terminal 62. If voltage pulses are applied simultaneously to the terminals 30 designated by the binary-decimal numbers 1 and 2 the flip-flop 1 changes from the B to the A state of conduction and produces a negative pulse on the lead 55 which is applied substantially simultaneously with the binary-decimal 2 input pulse at the lead 12. In consequence, the flip-flop 2 receives only a single input pulse and is flipped to the B state of conduction and a negative voltage appears only at the terminal 62 designated by the numeral 2. The delay in operation of the flip-flops is so small that as a practical matter the negative pulse generated by the flip-flop 1 and the input pulse applied to the binary-decimal 2 terminal 30 overlap. The timing provided by the broken ring counter, however, prevents an interaction between these pulses. Assuming again that the flip-flop 1 is in the B state of conduction and that a pulse is applied to the binary-decimal 1 and 2 terminals 30 and that these pulses are gated sequentially by means of voltages generated by the broken ring counter 42 successively on the leads 33 and 34, then the pulse at the binary-decimal 1 terminal 30 is gated first and causes the flip-flop 1 to change from the B to the A state of conduction and to apply a negative pulse to the lead 55 which changes the flip-flop 2 to the B state of conduction. Thereafter, the pulse appearing on the binary-decimal 2 terminal 30 is gated through the gate 24 and is applied via the lead 12 to the flip-flop 2. The flip-flop 2 now changes from the B to the A state of conduction and produces a negative pulse on the lead 56 which causes the flip-flop 3 to change from the A to the B state of conduction. A negative voltage is now applied to the terminal 62 in the binary 4 position which is the correct summation of the numbers 1 and 3. The delay between the application of gating voltages to the leads 33 through 41 obviously must be at least equal to or greater than the delay in the generation of a feedforward pulse by each of the flip-flops 1 through 7 and this delay is controlled by the frequency of the output voltage of the oscillator 43. As a practical matter the delay through the flip-flops 1 through 7 is approximately a half of a microsecond and the oscillator may be chosen to have a period equal to one microsecond to provide a half microsecond margin of safety.

Proceeding now to a description of the operation of the circuit upon the application of voltage pulses indicative of numbers in the decimal system of notation, upon the application of a pulse to the terminal 67 designated by the decimal number 1 the pulse is fed directly to the flip-flop 1 causing it to change its state of conduction from the A to the B state. Similarly, the decimal numerals corresponding with binary numerals such as the decimal numerals 1, 2, 4, 8, 16, 32, 64, 128, etc., may be applied directly to the various flip-flops representative of these numbers in the binary system of notation. However, where a decimal numeral must be represented by negative voltages at two or more output terminals 62, and must be applied therefore to two or more flip-flops, the pulse must be sequentially gated to the various flip-flops. For instance, the application of a pulse to the terminal 67 indicative of the decimal numeral 3 must be applied to the flip-flop 1 and 2 so as to produce negative voltages at the terminal 62 designated by the numerals 1 and 2, the summation of which is 3. Consequently, the gates 71 and 74 are interposed between the terminal 67 in the decimal 3 position and the leads 65 and 68, respectively, which apply pulses to the flip-flops 1 and 2. As an example of the necessity for the use of gates in this portion of the circuit assume that the flip-flop 1 is initially in the binary 1 position, that is, in the B state of conduction. If the pulses applied to the terminal 67 in the decimal 3 position were applied simultaneously to the flip-flops 1 and 2 the negative feedforward pulse from the flip-flop 1 to the flip-flop 2, generated on the lead 55, would arrive substantially simultaneously with the negative voltage pulse applied to the lead 12 via the lead 68, and the flip-flop 2 would effectively receive only a single input pulse. In consequence, the flip-flop 2 would obtain the B state of conduction and produce a negative voltage at the terminal 62 designated by the numeral 2. In accordance with the present invention, the voltages appearing on the terminal 67 designated by the decimal numeral 3 are gated first to the flip-flop 1 and then to the flip-flop 2 through the gates 71 and 74, respectively, by means of negative voltage pulses appearing on the leads 33 and 34, respectively. Inasmuch as a conventional generator of voltages in accordance with the decimal number system, generates only a single voltage at any given time there is no necessity for gating the voltages to the various input terminals 67, since of necessity they always arrive at spaced time intervals.

It will be noted that the circuit of the present invention may receive information in accordance with either the decimal or binary-decimal system of notation and the information in accordance with the two systems may be interspersed; that is, successive sets of input voltages may be applied that are indicative of numbers in the binary-decimal system, successive sets of input voltages may be applied that are indicative of numbers in the decimal system of notation or voltages indicative of numbers in the two systems may be applied sequentially and successively. Regardless of the form of the information applied to the circuit, the circuit rapidly and accurately and with the utilization of a minimum number of circuit elements converts a number in either system of notation to a number in the pure binary system of notation.

In the system illustrated in FIGURE 1 it is necessary to gate a voltage indicative of decimal information where a voltage pulse represents a number requiring the operation of two or more flip-flops such as the numbers 3, 5, 7, etc. In accordance with a second embodiment of the invention illustrated in FIGURE 2 of the accompanying drawings, the decimal information may be applied simultaneously to any number of flip-flops as a result of appropriate timing provided for by the internal circuitry of the system. It should be noted that with the system of FIGURE 2, the binary-decimal information must still be gated for reasons to be explained subsequently. The circuit elements common to FIGURES 1 and 2 of the accompanying drawings are designated by the same reference numerals. In this circuit the leads 9′, 12′ through 17′, 46 and 49 are connected to the gate circuits 11, 24 through 29, 31 and 32 as illustrated in FIGURE 1, broken ring counter 42, oscillator 43 and gate 44 also being employed as in FIGURE 1 the terminals 67 designated by the decimal numerals 1, 2 and 4 are connected through their respective diodes 66, 70 and 71 to the leads 9, 12 and 13 which in turn are connected to the input circuit of the flip-flops 1, 2 and 3. The terminal 67 designated by the numeral 3 is connected via diodes 72 and 75 and leads 94 and 95, respectively, to the leads 9 and 12. The terminal 67 designated by the numeral 5 is connected via diode 78 and 81 and leads 96 and 97, respectively, to the leads 13 and 9, respectively. The terminal 67 in the decimal 1 position is connected through diodes 84 and 86 to the leads 98 and 99 to the leads 13 and 12, respectively, and the terminal 67 designated by the decimal numeral 7 is connected via diode 89, 91 and 93 and leads 100, 101 and 102 to the leads 13, 12 and 9, respectively. In this embodiment of the invention the output circuit of the A section of the flip-flop 1 is connected via lead 55 and delay line 103 to the lead 12 and the leads 56 through 61, connected to receive voltage pulses from the output circuits of the A section of the diodes 2 through 8, respectively, are connected via delay lines 104 through 109 to the leads 13, 14, 15, 16, 17 and the input circuit of the flip-flop 8, respectively. The delay lines 103 through 109 are preferably 1 microsecond long but may be a half-microsecond long which is the delay in operation of the flip-flops 1 through 8. The operation in the embodiment of the invention illustrated in FIGURE 2 of the accompanying drawings is identical with that of the circuit illustrated in FIGURE 1 with respect to conversion of numbers in the binary-decimal system with the numbers in the binary system. The operation of the circuit with respect to the conversion of the numbers in the decimal system, however, is altered by the inclusion of the delay lines 103 through 109.

In this embodiment of the invention the voltage pulses applied to the input terminals 67 designating numerals which require the operation of more than one flip-flop may be applied directly to the various flip-flops without requiring gating of these voltages. An example of the operation of the circuit is described assuming the application of an input pulse to the terminal 67 designated the decimal numeral 3 and further assuming that the flip-flop 1 is in the B state of conduction. Upon the application of a pulse to the designated terminal 67 a voltage pulse is applied to the lead 9 which effects a transfer of conduction of the flip-flop 1 from the B to the A state. In consequence, a negative voltage pulse is produced on the lead 55 and is delayed by the delay line 103 for a sufficient length of time for the pulse applied through the diode 75 and via lead 12 to the flip-flop 2 to have effected a change of state of the flip-flop 2 from the A to the B state of conduction. After the occurrence of the initial change from the A to the B state of conduction the negative voltage pulse generated on the lead 55 produces a further change in the flip-flop causing it to shift from the B to the A state of conduction and thereby effecting the production of a negative voltage pulse on the lead 56. After delay imparted by the delay line 104 the pulse is applied to the lead 13 and effects the reversal of conduction of the flip-flop 3 from the A to the B state. A negative voltage now appears on the output terminal 62 designated by the numeral 4. It may be seen from the above that the delay lines 103 through 109 appropriately time the various input pulses applied to the lead 67 so that there can be no interaction between feed-forward pulses developed on the leads 55 through 61 and input pulses applied directly to the terminals 67. As in the embodiment of the circuit illustrated in FIGURE 1 of the accompanying drawings decimal and binary-decimal information may be applied alternately or in alternate groups and the circuit may accommodate either type of input and sum the total of these inputs regardless of whether the information was originally applied in accordance with the decimal or binary-decimal system of notation.

The two embodiments of the present invention provide circuitry which not only may convert the numbers in either of the two designated systems of notation, but may also sum successive inputs to provide a numerical output in accordance with the binary-notation which is the sum of successive inputs in either of the two original numerical systems. The various diodes employed in the circuit serve to isolate the various input leads from one another. For example, upon the application of a negative pulse to the terminal 67 designated by the decimal numeral 1 the cathode of the diode 66 is driven negative and the pulse is passed to the lead 9. The negative pulse proceeds to the flip-flop 1 but is blocked from the lead 9', which leads back to the gate circuit 11, by the action of the diode 10, the negative pulse being applied to the plate of this diode and therefore preventing its conduction and passage of the pulse through this diode.

The embodiments of the invention illustrated in FIGURES 1 and 2 of the accompanying drawing provide for the conversion of numbers in a range of 1 to 255 only in the binary-decimal system and from 1 to 7 only in the decimal system. It is obvious that by extension of the present system, that is, by a multiplication of the elements illustrated and described, the range of numbers which may be converted may be extended to within any practicable limits desired.

The ring counter 42 is described as a broken ring counter, that is, a counter which will step successively from a first to a last stage and which will thereafter require a reset pulse to bring the counter back to conduction of the first stage. It is preferred to employ a broken ring counter in the present invention rather than a conventional ring counter so that in case the counter falls out of the step with the oscillator 43 it is resynchronied at the end of each counting cycle by the reset pulse applied to the counter 42 over the lead 44.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A system for providing a binary indication equal to the sum of a decimal signal and a binary decimal signal, comprising first conversion means responsive to said binary decimal signal for generating a signal indicative of the binary value of said first signal, said first conversion means including *m* signal carrying output leads, second conversion means responsive to said decimal signal for generating a further signal indicative of the binary value of said second signal, said second conversion means including *n* signal carrying output leads, *p* cascaded flip-flops, one of said flip-flops being included for each order of the binary indication wherein *p* is at least equal to the larger of *m* and *n*, each of said flip-flops having an input terminal directly responsive to the output signal of the previous order flip-flop, each input terminal of *n* of said flip-flops being directly responsive to the signal on a different one of said *n* leads, each input terminal of *m* of said flip-flops being directly responsive to the signal on a different one of said *m* leads, and timing means for preventing the output signal of each flip-flop to be applied to the next order flip-flop when output signals from said conversion means are supplied thereto, whereby the state of said flip-flops is indicative of the sum of successively generated binary-decimal and decimal signals.

2. A system for generating a binary signal indicative of the sum of a decimal signal and a binary decimal signal, comprising a plurality of first terminals responsive to the decimal signal, each of said first terminals being responsive to a different impulse commensurate with the value of said decimal signal, means for coupling each input terminal to at least one first lead, the number of leads coupled to each terminal being equal to the number of binary ones in the binary number commensurate with the decimal number associated with said each terminal, each lead coupled to said each terminal being designated by a different radix 2 order, whereby the total number of leads, *n*, equals the radix 2 order of the number of first terminals, a plurality of second terminals responsive to the binary-decimal signal, each of said second terminals being responsive to a different impulse commensurate with the value of said binary-decimal signal, means for coupling each second input terminal to at least one second lead, the number of leads coupled to each second terminal being equal to the number of binary ones in the binary number commensurate with the decimal number associated with said each second terminal, each lead coupled to said each second terminal being designated by a different radix 2 order, whereby the total number of second leads *m*, equals the radix 2 order of the highest decimal number associated with said second terminals, *p* flip-flops connected in cascade, wherein *p* is at least equal to the larger of *m* or *n*, one of said flip-flops for each radix 2 order of the binary indication, means for coupling the signals on each of the first and second leads of the same radix 2 order designation to the flip-flop associated with the same order, and timing means for preventing the output signal of each flip-flop from actuating the flip-flop of the next order when a signal is supplied thereto from the first and second leads.

3. The system of claim 2 wherein said timing means includes means for periodically and sequentially gating the signals on said second terminals to said second leads.

4. The system of claim 3 wherein the timing means includes means for delaying the output signal of each flip-flop to the next order flip-flop by a time less than said gating period.

5. The system of claim 3 wherein the timing means includes means for sequentially and periodically gating the signals on said first terminals to said first leads.

(References on following page)

References Cited in the file of this patent

UNITED STATES PATENTS

| | | |
|---|---|---|
| 2,364,540 | Luhn | Dec. 5, 1944 |
| 2,657,856 | Edwards | Nov. 3, 1953 |
| 2,729,811 | Gloess | Jan. 3, 1956 |
| 2,757,864 | Pollard | Aug. 7, 1956 |
| 2,812,134 | Adelaar | Nov. 5, 1957 |
| 2,823,855 | Nelson | Feb. 18, 1958 |
| 2,860,831 | Hobbs | Nov. 18, 1958 |
| 2,886,241 | Spaulding et al. | May 12, 1959 |
| 2,907,525 | Hobbs et al. | Oct. 6, 1959 |
| 2,947,479 | Selmer | Aug. 2, 1960 |

FOREIGN PATENTS

| | | |
|---|---|---|
| 1,077,205 | France | Apr. 28, 1954 |
| 1,096,931 | France | Feb. 9, 1955 |